United States Patent [19]

Brown et al.

[11] Patent Number: 4,869,360
[45] Date of Patent: Sep. 26, 1989

[54] LUG LOADER

[75] Inventors: Douglas J. Brown; William R. Newnes; John Sergeant, all of Salmon Arm, Canada

[73] Assignee: Newnes Machine and Ironworks Ltd., British Columbia, Canada

[21] Appl. No.: 925,525

[22] Filed: Oct. 28, 1986

Related U.S. Application Data

[63] Continuation of Ser. No. 810,525, Dec. 16, 1985, abandoned, which is a continuation of Ser. No. 521,123, Aug. 8, 1983, abandoned.

[51] Int. Cl.⁴ .............................................. B65G 47/26
[52] U.S. Cl. .................................. 198/460; 198/464.3; 198/463.4
[58] Field of Search ..................... 198/460, 461, 464.3, 198/463.4

[56] References Cited

U.S. PATENT DOCUMENTS

| | | | |
|---|---|---|---|
| 2,769,520 | 11/1956 | Davidson et al. | 198/491 |
| 2,980,234 | 4/1961 | De Koning | 198/460 |
| 3,080,042 | 3/1963 | Sherman | 198/460 |
| 3,081,863 | 3/1963 | Monohan | 198/460 |
| 3,348,655 | 10/1967 | Pierce, Jr. et al. | 198/461 |
| 3,894,627 | 7/1975 | Jabbusch et al. | 198/779 |
| 3,938,648 | 2/1976 | Ganz | 198/461 |
| 4,197,935 | 4/1980 | Aterianus et al. | 198/460 |

FOREIGN PATENT DOCUMENTS

| | | | |
|---|---|---|---|
| 50141171 | 1/1977 | Japan | 198/460 |
| 960107 | 9/1982 | U.S.S.R. | 198/461 |

*Primary Examiner*—Robert J. Spar
*Assistant Examiner*—D. Glenn Dayoan

*Attorney, Agent, or Firm*—James D. Hall; Thomas J. Dodd; Todd A. Dawson

[57] ABSTRACT

A lug loader for loading individual boards of lumber from a feed transfer to a lugged transfer in a lumber mill. A plurality of saw-toothed wheels engaged each board in turn and propels it onto the lugged transfer. A plurality of parallel stop members receive boards individually from the feed transfer, each stop member having a board-receiving portion to receive and support a board lying transversely across the stop members and a stop portion preventing further travel of the board when resting upon the stop members. The stop members are movable between raised and lowered positions and are located relative to the saw wheels such that a board lying across the stop members is maintained out of engagement with the saw wheels in their raised positions and may be lowered into engagement with the saw wheels. The presence or absence of a board on the stop members is detected and a control signal is generated in accordance with the condition detected. A lug index associated with the lugged transfer generates a control signal at predetermined points of progression of the lugged transfer whereat a lug is at a position to receive a board from the feed transfer. The control signals are applied to a controller which actuates the stop members such that when the lugged chain transfer is at an appropriate point to receive the board and the presence of the board on the stop members is verified, the signals applied to the controller causes the stop members to move to their lowered position and when it is detected that the board has been propelled forward by the saw wheels, the stop members are returned to their raised position to receive the next board. The combination of the positive saw wheel drive for the boards and the board detecting device eliminates many problems associated with conventional "backlog-fed" devices.

13 Claims, 9 Drawing Sheets

LUG LOADER

This is a continuation of application Ser. No. 810,525 filed on Dec. 16, 1985, and now abandoned, which is, in turn, a continuation of application Ser. No. 521,123 filed on Aug. 8, 1983, now abandoned.

This invention relates to the field of lumber handling and, more particularly, to a device known as a lug loader.

In a sawmill or planer mill, it is necessary to transport boards individually between certain stages of the operation. For example, in a sawmill, rough lumber is sawn into boards of varying cross-section which must be transported from the mill to an end trimmer and thence to a bin sorter. The boards emerge from the mill in random order and must be presented separately and individually to the end trimmer and bin sorter for proper processing. To accomplish this object, it is customary to use chain conveyors—more accurately called chain "transfers"—which comprise a number of chains running in parallel and across which the boards are placed transverse to their direction of travel. The boards are separated by lugs extending from the chains at regular intervals, the chains being synchronized to provide straight rows of lugs extending across the transfer and between which the individual boards are placed.

As stated above, the boards emerge from the mill in random order as a "blanket" of boards and it is therefore necessary to provide a mechanism which handles the boards individually and places them on the lugged chain transfer with only one board occupying each space between successive rows of lugs. Such a device is known as a "lug loader".

Conventionally, the blanket of boards is presented to the lug loader by means of a storage transfer or may simply be gravity fed. A movable stop mechanism of some kind is provided to intercept the leading board as it is presented to the lug loader and effectively halt the passage of the blanket temporarily until the immediately preceding board has been deposited onto the lugged chain transfer and the next set of lugs has moved into position to accept the next board. The blanket is thus allowed to proceed incrementally so that as each board advances to become the leading board, it is individually loaded onto the lugged chain transfer.

Whether the lug loader is transfer-fed or gravity-fed, it is nevertheless common to employ the backlog of boards in the blanket to push the leading board onto the lug loader. This creates a problem of skewing and buckling of the boards in the blanket so that they are not properly presented to the lug loader with the result of improper loading on the lugged chain transfer—the most common problem being loading of more than one board in the same lug spacing. Various solutions have been proposed by the prior art with varying degrees of success but, generally speaking, unless some form of constraint mechanism is provided—such as hold-down shoes or wheels—the blanket of boards will tend to buckle or skew as the loader mechanism stops the forward passae of the blanket. With the result that the loader cannot be left to operate without supervision. Also, there is a problem throughput with conventional loaders—in other words, the speed attainable without encountering loading problems is considerably less than that of other processes in the mill, which obviously slows down the entire operation.

Examples of prior art lug-loaders are taught by U.S. Pat. Nos. 3,989,135 (Pyykonen); 3,081,863 (Monohan); 3,923,142 (Rysti); and 3,111,214 (Heikinheimio). For the most part, these are gravity-fed devices with the attendant problems of buckling and uneven feeding referred to above. Heikinheimio employs a chain storage transfer to feed his lug loader but the apparatus is unsuitable for boards of mixed dimensions. Also in Keikinheimio, an overhead hold-down mechanism is required to hold the boards down on the lugged transfer since there would be a tendency for the boards to ride up over the synchronizing mechanism for the stop arm.

The present invention seeks to improve upon prior art lug loaders as exemplified by those listed above by providing a device with increased through-put speed and reliability but with lower complexity of construction and operation.

According to the invention, there is provided a lug loader for transferring lumber boards from a feed transfer to a lugged transfer mechanism at timed intervals. The device comprises a plurality of rotating members adapted to engage the boards and accelerate same onto the lugged transfer mechanism; and a plurality of stop members are provided to engage each board and maintain said board out of engagement with said rotating members in a raised position of each said stop member and to permit the board to fall onto the rotating members in a lowered position of each said stop member. Sensing means are provided for sensing the presence of a board in position for engagement with said rotating members and means are provided for moving said stop members between said raised and lowered positions in synchronization with the movement of said lugged transfer mechanism in order to permit said boards to be accelerated onto said lugged transfer mechanism at timed intervals, whereby only one board occupies each lug spacing.

The rotating members are in the form of saw-toothed wheels to ensure positive engagement with the boards.

Thus, instead of relying upon a backlog of boards to push the individual boards through the loader, the boards are accelerated positively and one board at a time by the rotating members. However, where the feed transfer is fed by the storage transfer from the mill, for example, it is possible that backlog could build up on the feed transfer. To minimize that possibility, it is preferable to provide means for detecting build-up of boards on the feed transfer and to either slow or stop the storage transfer until the backlog has cleared through the lug loader. The detecting means preferably comprises a photoelectric-eye.

The stop members are preferably in the form of a series of arms (hereinafter called "duckers") which are secured (preferably clamped) to a shaft and rotatable in tandem with the shaft between their raised and lowered positions. The drive means for the duckers conveniently comprises an air cylinder connected to a crank secured to the shaft and rotatable therewith and which is under the control of an electronic controller which provides actuating signals to the drive means at appropriate intervals. Input signals to the controller are derived from the above-mentioned sensing means and also from a lug index associated with the lugged chain transfer. Thus, the lug index provides a signal to the controller to lower the duckers at the appropriate time to drop the board onto the saw tooth wheels. The timing is such that the board is accelerated into the lugged transfer and impinges upon the trailing surface of one lug and is caught by the leading surface of the immediately following lug as the lugged transfer progesses. The lug index may, for example, be in the form of an electric-eye which detects the lug positions or a signal generator associated with the drive for the lugged transfer.

The means for sensing the presence of a board on the stop arms is also preferably in the form of a photoelectric-eye circuit and its primary function is to signal the controller to actuate the drive means for the duckers to raise them once again once the board has been accelerated onto the lugged transfer, so that the duckers are in position for the next board. However, the logic circuitry of the electronic controller is also such that the controller will not provide an output signal causing the duckers to rotate from their raised to their lowered positions upon receiving a signal from the lug index, unless a signal is also applied from the sensing means indicating that a board is present on the duckers. The purpose of this precaution is to prevent the duckers from dropping before a board is properly located thereon, regardless of whether or not the lug index has signalled the arms to drop.

The invention will now be described further by way of example only and with reference to the accompanying drawings, wherein:

FIGS. 7A and 7B are schematic plan views illustrating a part of the apparatus shown in FIG. 6, with boards of lumber located thereon;

FIG. 8 is a plan view of a further embodiment of the invention, showing a corresponding part of the apparatus to that shown in FIGS. 7A and 7B;

FIG. 9 is a side view of a part of the apparatus shown in FIG. 8;

Figure 1A:
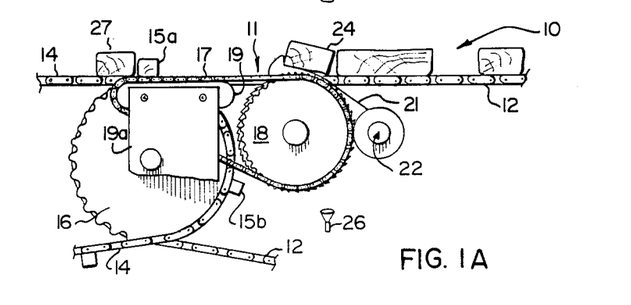
FIGS. 1 through 4 are side elevations of part of a lug loader according to a preferred embodiment of the invention, showing the progression of a board of lumber from the feed transfer to the lugged chain transfer.
Figure 1B:
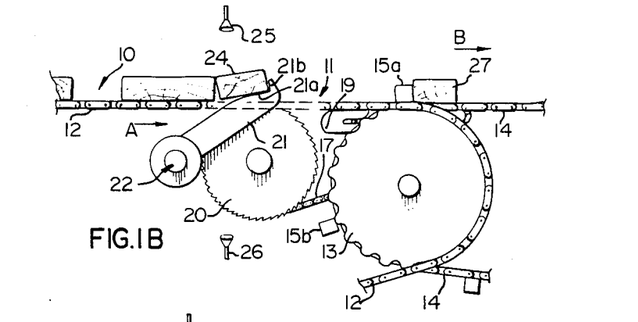

Considering firstly FIGS. 1A and 1B, there is shown a feed transfer including a plurality of parallel lugged feeder chains 12, each engaged with a sprocket 13 (see FIG. 1B). The a lug loader 11 deposits boards from a train or blanket of boards 10 advancing upon the feeder chains 12 onto a lugged chain transfer comprising a plurality of parallel chains 14 each having lugs 15a, 15b, etc. extending therefrom at equispaced intervals and each chain 14 being engaged with a sprocket 16 coaxial with the sprockets 13 (see FIG. 1A).

As best shown in FIG. 1A, the lug loader itself comprises a plurality of roller chains 17, each driven by a sprocket 18 and journalled around a chain guide 19 which is adjustably mounted upon frame 19a to permit tensioning of the roller chain 17. Adjacent the sprockets 18 and coaxial therewith are a plurality of parallel saw-wheels 20, the teeth of which extend slightly above the level of roller chains 17. A plurality of duckers 21 are pivotally mounted beneath the transfer 12 and each ducker is shaped to form a board receiving portion 21a and a stop portion or shoulder 21b. Desirably, the board-receiving portion of each ducker is curved to match the perimeter of the saw wheel in order to provide a smooth transfer of the boards. The duckers are mounted upon and clamped to a shaft 22 having a crank 43 extending therefrom which engages the piston rod of an air cylinder 23 (see FIG. 6).

It will beappreciated that the drawing FIGS. 1 through 4 show only one of each of the elements described. As stated above, there are a plurality of chains 12 and 14 located in parallel side-by-side relationship respectively to form the feed transfer and lugged chain transfer and a plurality of roller chains 17 and associated sprockets, guides and saw-wheels 20 and duckers 21. These may clearly be seen from FIGS. 5 and 6, but for the sake of simplicity and to clearly illustrate the function of each of the foregoing components in the context of the lug loader as a whole, only one set of components is shown in each of FIGS. 1 through 4.

Figure 2:
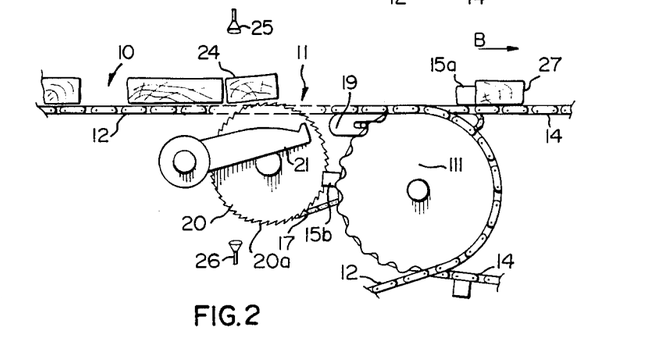

Referring now to FIGS. 1A and 1B, a blanket of boards designated generally by the reference numeral 10 is fed to the feed 11 by means of the lug feeder transfer chains 12 moving in the direction of arrow A. The leading board 24 breaks the beam of an electric-eye circuit constituted by a light source 25 and an electric-eye detector 26 and available as a kit under the trademark OPCON. The ducker 21 is rotatable between an upper position as shown in FIGS. 1A and 1B (in which position, the board 24 is held clear of the saw-wheel 20) and a lower position as shown in FIG. 2 and is under the control of an electronic controller which is triggered by sensing means associated with the lugged transfer chains 14. The sensing means (which is entirely conventional and may be in the form of a lug index, for example) emits control pulses to the controller in relation to the position of the lugs on the transfer chains 14, and, provided the electric-eye circuit verifies the presence of a board on the ducker 21, the controller activates the air cylinder 23 to cause the ducker 21 to drop at the appropriate point of rotation of the lugged transfer, as is described in relation to FIG. 2.

Figure 10:
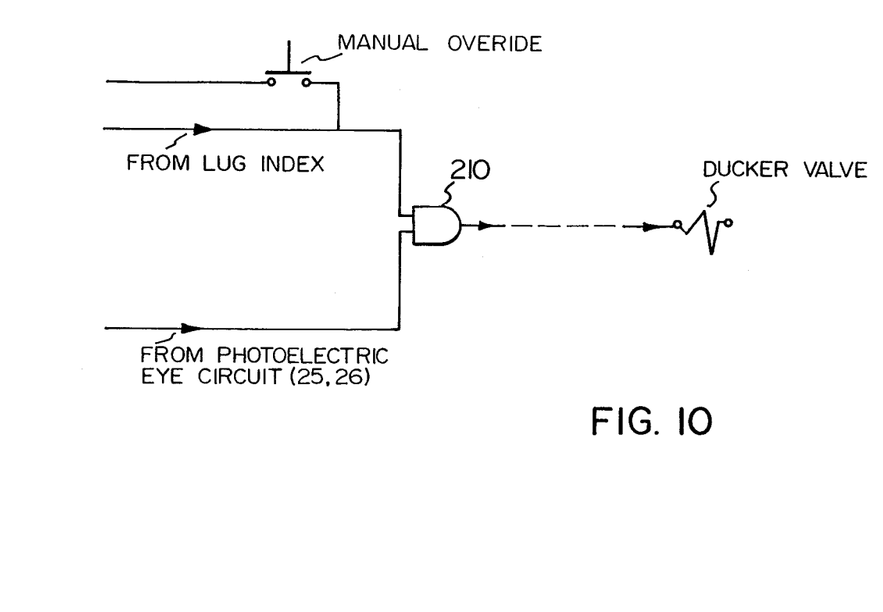
FIG. 10 is a schematic logic diagram of an electronic controller for use with the apparatus of FIGS. 1 through 6.

The electronic controller is shown schematically in FIG. 10 and is essentially a logic circuit which accepts input signal pulses from the lug index and from the photoelectric-eye circuit (25,26) and on the basis of those signals provides output signals to actuate the air cylinder 23 for the duckers 21. More specifically, the output signal is applied to a solenoid operated valve (the "ducker valve") which is in the air supply to cylinder 23. Thus, when the output signal from the controller is applied to the ducker valve, the valve opens to either admit air to the cylinder 25 or block the air supply thereto (depending on how the cylinder is configured) with consequent rotation of the duckers 21 (see also FIG. 6).

Referring still to FIG. 10, the input signals from the lug index and the photoelectric-eye circuit (25,26) are applied to an AND gate circuit 210 so that an output is only obtained when both input signals are present. Provided a board is in place on the duckers, the light beam between elements 25 and 26 is interrupted and a signal is applied to one input of the AND gate circuit. Thus, when a signal from the lug index is applied to the other input of the circuit 210, an actuating output signal is applied to the ducker valve. If no board is present on the duckers 21, however, only the lug index signal will be applied to AND circuit 210 and no actuating output signal will occur. The lug index signal may be generated in a variety of conventional ways, all of which provide one signal pulse per lug spacing of the lugged transfer chains 14. The signal pulses may be generated by a photoelectric-eye circuit or by a signal generator tied to the lugged transfer drive. The essential point is that, no matter what form the lug index takes, it must provide pulses for the logic circuit 210 which are timed to occur at specific positions of the lugs relative to the duckers 21, thus ensuring that the latter drop at the correct moment. To provide manual control of the duckers, when required, a manual override switch is located in parallel with the lug index. By virtue of the photoelectric-eye circuit (25,26), the controller can compensate for boards of varying widths, as will hereinafter become apparent. An additional feature of the controller is a time delay circuit (which may be in the form of a monostable multivibrator, for example), which is described in relating to FIG. 13 and the purpose of which will also become apparent after a consideration of FIGS. 2 through 4.

Figure 11:
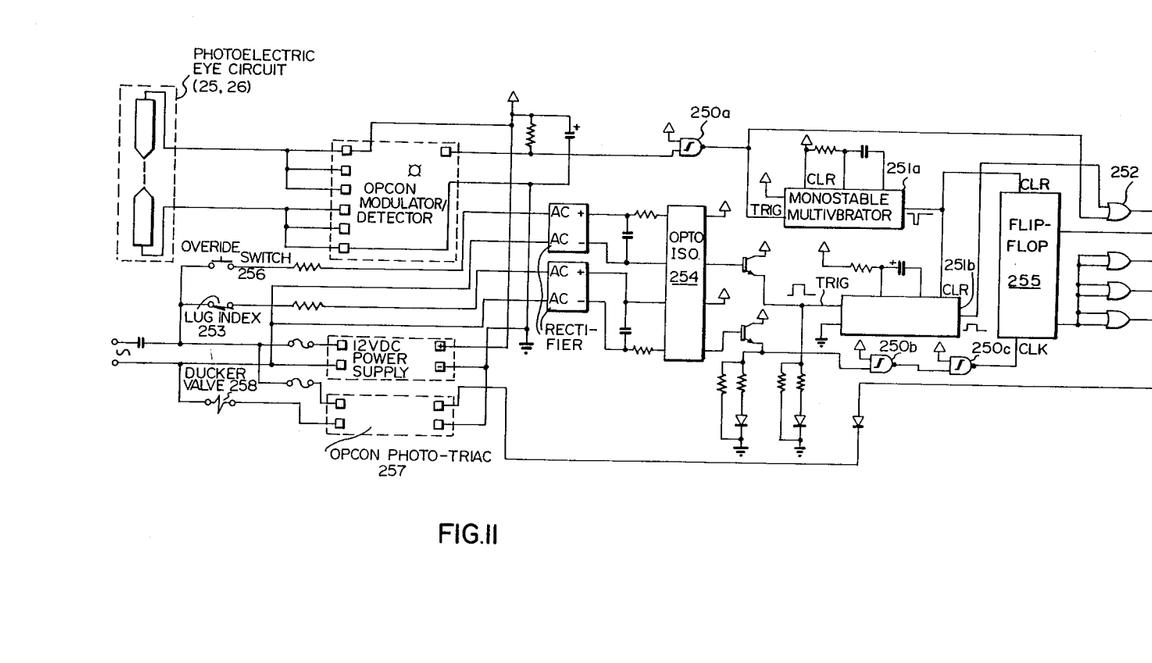
FIG. 11 is a detailed schematic of part of the circuit of FIG. 10.

Referring now to FIG. 11, a more detailed schematic diagram of the controller is shown. The output of the OPCON modulator/detector circuit is applied to Schmitt trigger 250a, the output of which is applied both to the TRIGGER input of a monostable multivibrator 251a and to one input of OR gate 252. A rectified a.c. signal from closing the lug index 253 is applied to opto-iso circuit 254, one output from which is applied through Schmitt triggers 250b and 250c to the CLOCK input of a flip-flop 255. A rectified a.c. signal from closing of the override switch 256 is also applied to the circuit 254 when such switch is activated. A second output from circuit 254 is applied to the TRIGGER input of a monostable multivibrator 251b, the output from which is applied to the second input of OR gate 252. The output from gate 252 is applied to flip-flop 255, the output from which is applied through parallel OR-gates and through OPCON photo-triac 257 to ducker valve 258.

Figure 12A:
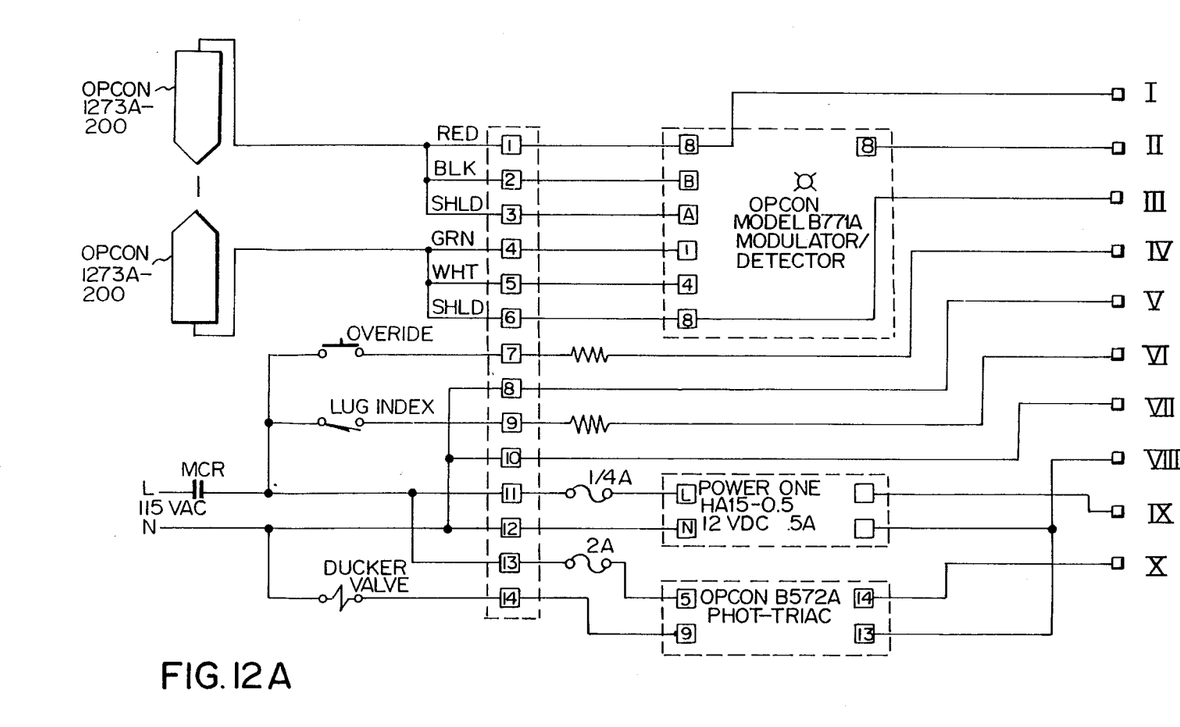
FIGS. 12A and 12B are further schematic diagrams of the electronic controller.
Figure 12B:
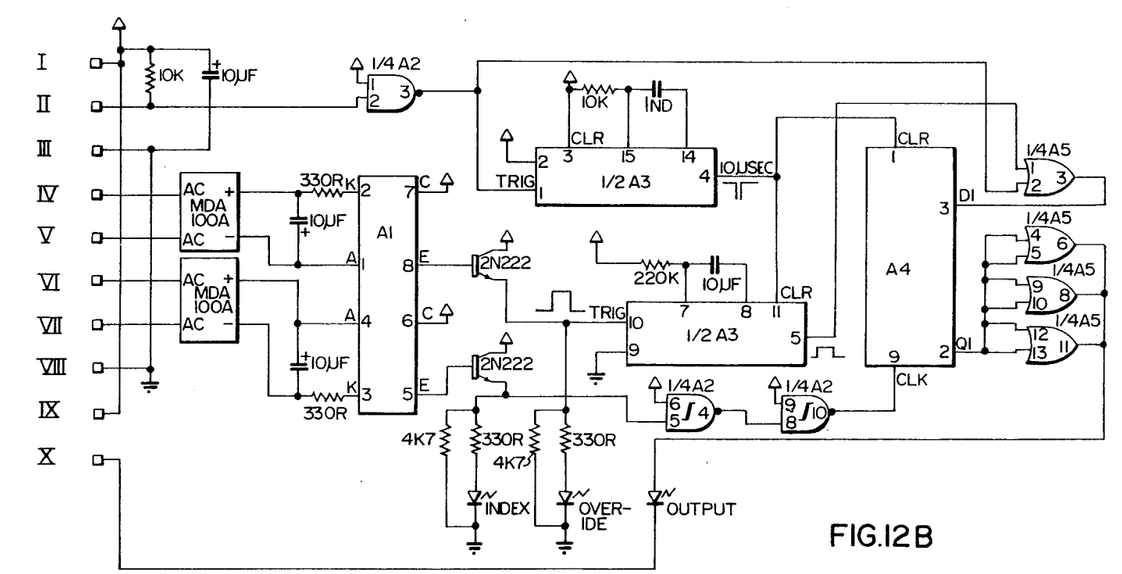

A detailed schematic showing component values and identification is shown in FIGS. 12A and 12B, and it may be noted that the following specific devices may be used for the referenced circuit elements:

| REF. | TYPE | FUNCTION |
| --- | --- | --- |
| 254 | ILCT-8 | OPTO-ISO |
| 250 | CD4093 | SCHMITT TR. |
| 251 | 74C221 | MONO. MULTI. |
| 255 | 74C174 | D FLIP/FLOP |
| 252 | 74C32 | OR GATES |

According to the sequence of FIGS. 1 through 4, the function of the apparatus will be described with reference to the transfer of the board 24 from the position shown in FIGS. 1A and 1B to the lugged transfer chains 14 in such manner that the board comes to rest in the position shown in FIG. 4—i.e., upon the transfer chains 14 between the lugs 15a and 15b. It may be seen from FIG. 1B that at the start of the sequence a board 27 is already on the transfer 14 and its trailing edge is engaged by the leading edge of the lug 15a, relative to the direction of motion of the chains 14 as shown by the arrow B in the drawing.

Referring now to FIG. 2, it may be seen that the lugged transfer 14 has advanced so that the lug 15a and the board 27 have now moved slightly to the right in FIG. 2 and the lug 15b has advanced to eventually receive the board 24. At this point, the electronic controller is signalled by the lug index on the transfer chain 14 to activate the air cylinder 23 to drop the ducker 21 and thus allow the board 24 to fall onto the rotating saw wheel 20. As soon as the board 24 contacts the saw wheel 20, the teeth 20a engage the underside of the board and accelerate it to the right in the drawing and onto the roller chain 17 moving across the chain guide 19.

Figure 3:
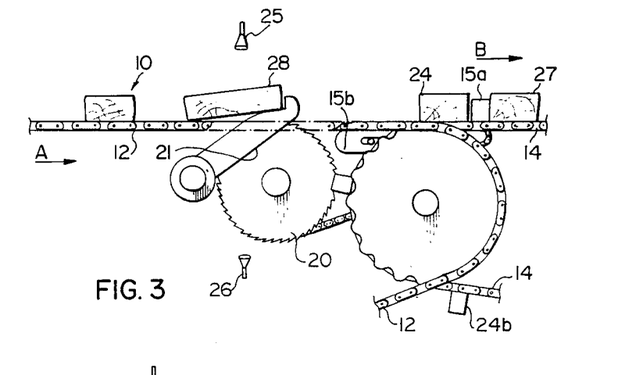

Referring now to FIG. 3, the board 24 has been accelerated across the roller chain 17 and against the trailing edge of the lug 15a, by the rotation of the saw-wheel 20. The force of the board impinging upon the lug 15a causes the board to straighten and lie transversely of the lugged transfer chains 14, before it is contacted by the lug 15b. Also, it may be seen that the ducker arm 21 has now moved back into the raised position, such movement being actuated by the electronic controller, which is triggered by the light beam from the source 25 reaching the detector 26 as the trailing edge of the board 24 clears the path of the light beam.

Figure 4:
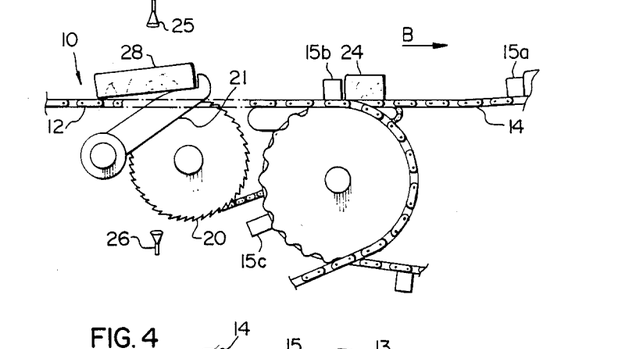

Referring now to FIG. 4, the lug 15b has moved into engagement with the board 24 and the following lug 15c is now in position to receive the next board 28 which has moved onto the ducker 21, in precisely the same manner as was the board 24 at the beginning of the cycle shown in FIGS. 1A and 1B. At this point, the light beam is again interrupted and, under the control of the electronic controller, the ducker is therefore ready to move down again at the appropriate point of advancement of the chain 14.

Figure 13:
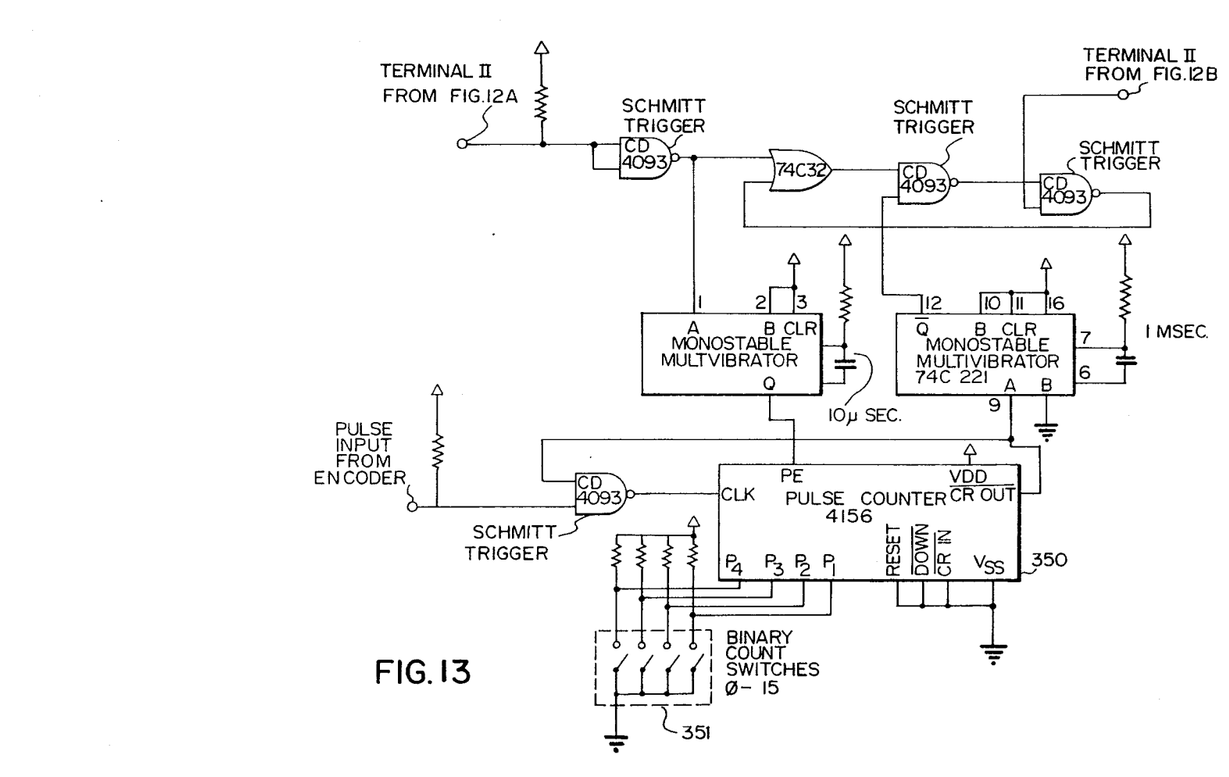
FIG. 13 is a schematic diagram of the time-delay circuit.

As stated above, the photoelectric-eye combination (25,26) will not permit the electronic controller to generate an actuating signal to the ducker valve to raise the duckers 21 until the trailing edge of the board being loaded has cleared the path of the light beam, in order to compensate for boards of varying widths. However, if the machine is moving at only low or moderate speeds, immediate raising of the duckers before the board as completely cleared them could possibly result in the board being flipped or otherwise misfed to the lugged transfer. To compensate for this, the time delay circuit of FIG. 13 is incorporated in the controller and it operates by adjustably delaying the application of the signal from the control circuit 210 to the ducker valve. If the machine is operating at high speed (say, 80 lugs per minute), the delay need only be minimal or even zero since the board will be accelerated sufficiently quickly that it will clear the duckers before the mechanism raises them again. Thus, an adjustment control 211 may be provided on the time delay circuit to permit the delay to be increased as the operating speed or throughput of the machine decreases, or the adjustment may be made automatically within the circuit. Conveniently, the time delay circuit may include a pulse counter which accepts triggering pulses from the electric eye combination (25,26) and counts a preset number of pulses. The count-rate is geared to the speed of the lugged chain transfer and may be, for example, 50 pulses per lug spacing—i.e. 50 pulses are counted between the passage of successive lugs past the lug index. If the counter is set at 25 pulses, for example, the time delay is automatically half the time between successive lugs passing the same point. Thus, the ratio of the delay time to the speed of the lugged transfer may be set manually and thereafter the actual time will automatically vary with the speed of the machine to give decreasing delay with increasing throughput speed.

Referring to FIG. 13, it may be seen that the time delay circuit is connected between the terminals B of FIGS. 12A and 12B, respectively—i.e. between the photo-electric eye modulator/detector and the input to the control circuit. With a board in position on the duckers, the photocell 26 is "dark"'i.e., the light from the light source 25 is interrupted. In this condition, the signal from the modulator/detector is low and assuming counter 350 is at zero, the output is latched low and no enabling signal is therefore generated for the ducker valve. When the board clears the photo-electric eye circuit and the photocell goes "light", the signal from the modulator/detector goes high and the pulse counter 350 begins to count the predetermined numbers of pulses as a fraction of the total number of pulses between successive inputs from the lug index. This parameter is set by means of binary count switches 351. After the preset number of pulses is reached, a 1 msec. pulse unlatches the output from the circuit and the output to the remainder of the control circuit goes high—thus resulting in an enabling signal for the ducker valve to return the duckers to their raised positions.

Figure 5:
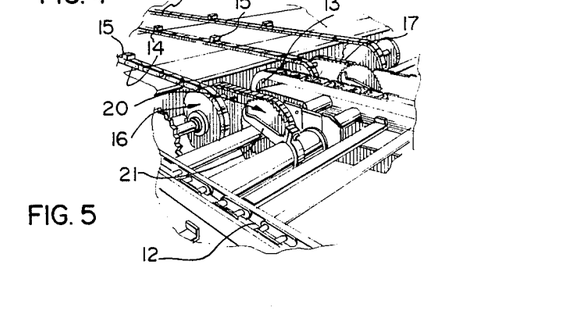
FIG. 5 is a perspective view of part of a lug loader according to the embodiment illustrated in FIGS. 1 through 4.

FIG. 5 is a perspective view of a plurality of mechanisms as described above, located and operating in tandem, and having like reference numerals to those of FIGS. 1 through 4.

Figure 6:
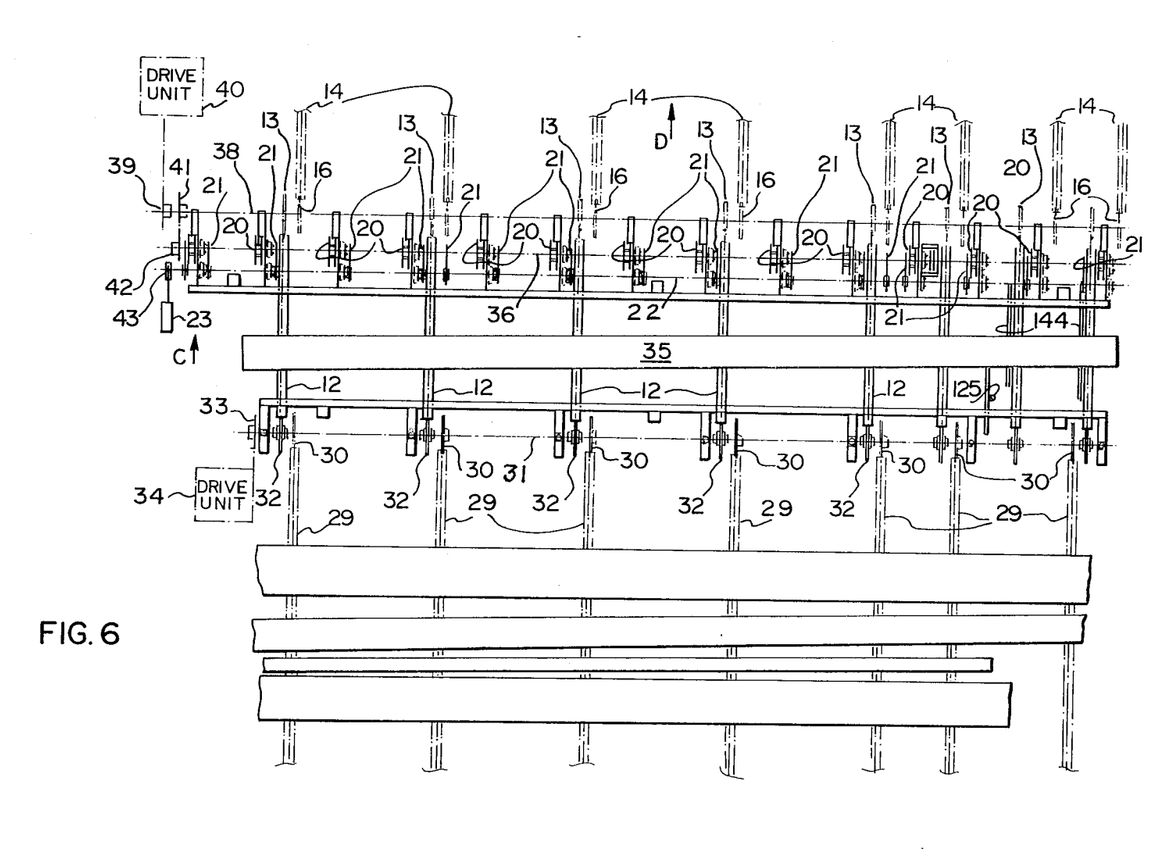
FIG. 6 is a plan view of a lug loader according to the embodiment illustrated in FIGS. 1 through 5.

Referring now to FIG. 6, there are further provided storage transfer chains 29, which engage sprockets 30 keyed to a common shaft 31 with idler sprockets 32 for the feed transfer chains 12. The shaft 31 is chain driven through a sprocket 33 by means of a drive unit 34. A long board 35 is shown resting on the feed chains 12 and being carried towards the lug loader in the direction of the arrow C. In practice, a few boards would normally be present on the chains 12 as a blanket of boards in the manner shown in FIGS. 1 through 4, but only one board is shown here for the sake of clarity. As the board 35 advances upon the feed transfer chains 12 as part of a blanket of boards fed by the storage transfer chains 29, it is intercepted by the duckers 21 and then dropped onto the saw-wheels 20, which accelerate it onto the lugged chains 14. The saw-wheels 20 are secured to a common shaft 36 and the duckers 21 are secured to common shaft 22, whereby they all operate in tandem according to the sequence of FIGS. 1 through 4. Idler sprockets 16 for the lugged chains 14 freely rotate upon a shaft 38, to which are secured drive sprockets 13 for transfer chains 12. The shaft 38 is chain driven through a sprocket 39 by means of a drive unit 40, which is conveniently the existing drive for the lugged transfer chains 14. Also secured to shaft 38 is a sprocket 41, which chain drives a sprocket 42 secured to shaft 36. The shaft 37 is rotated to raise and lower the duckers 21 by means of air cylinder 23 connected to a crank 43 upon shaft 22.

Thus, the board 35 advances upon the chains 12 until it comes to rest upon the duckers 21, which are at this point in their raised position. Operating in tandem and following the sequence of FIGS. 1 to 4, the board is lowered onto the saw-wheels 20, accelerated across the roller chain 17 and thence onto the lugged transfer chains 14 and transported away in the direction of arrow D.

Also shown in FIG. 6 is a second photoelectric-eye combination 125 which is positioned to detect a backlog of boards on the feed transfer chains 12. Thus, if the blanket of boards builds up on the feed transfer to the point where it is detected by the photoelectric eye 125, a signal is passed to the drive unit for the storage transfer chains 29 which either slows or stops the storage transfer chains 29 entirely until the backlog has cleared from the feed transfer chains 12. This precaution assists in preventing the problems of buckling and uneven feeding which have been experienced with many prior art devices.

Figures 7, 7A, 8, 9:
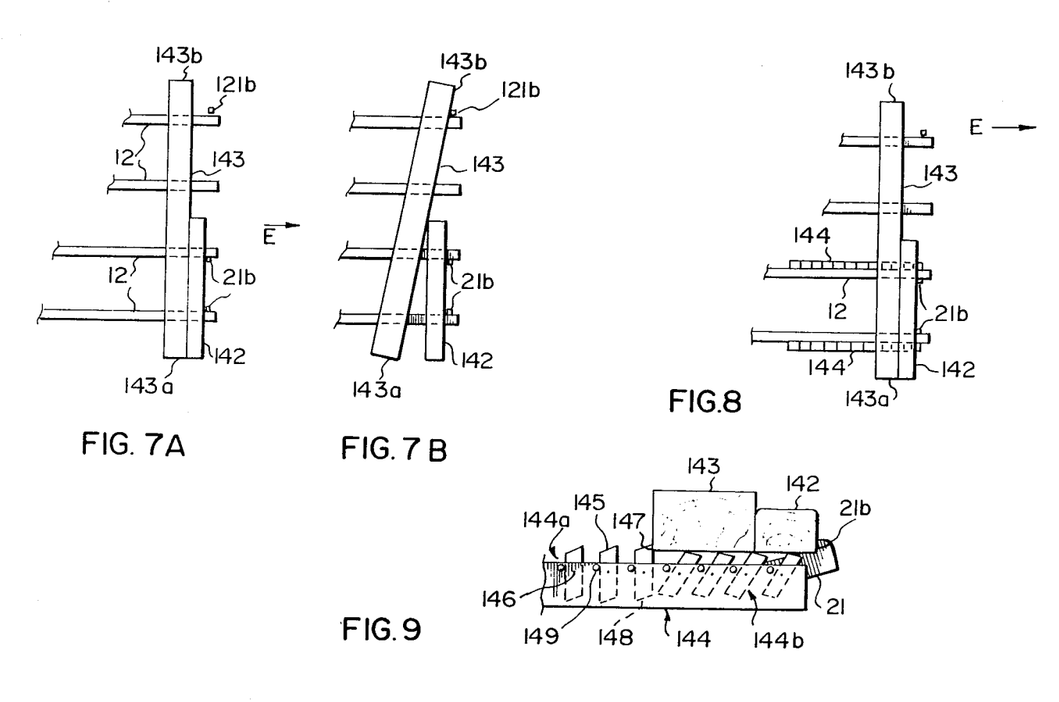

It can happen that when a short board is fed onto the chains 12 ahead of a long board, the chains tend to pull the free end of the long board forward and the opposite end being backed up against the short board then skews rearwardly, thus creating a potential feeding problem. This is illustrated in FIGS. 7A and 7B. Referring to these figures, a short board 142 has been carried by chains 12 until it engages stop portions 21b of the duckers 21 of FIGS. 1 through 4. Following the board 142 is a longer board 143 and as the chains 12 move in the direction of the arrow E, the end 143a adjacent the board 142 is restrained from further motion but the end 143b is free to travel further as the chain 12 continue to move, until it abuts ducker stop portion 121b (see FIG. 7B). As may be seen, the continued movement of the end 143b causes the board 143 to skew and unless the board straightens itself after the board 142 has passed, it will be in a skewed position for delivery to the saw-wheels 20 with the attendant likelihood of misfeeding to the lugged transfer 14.

FIGS. 8 and 9 illustrate an embodiment of the invention whereby the board 143 is maintained in correct transverse orientation relative to the chains 12, by effectively preventing the end 143a from swinging rearwardly as the opposite end 143b tries to advance. Located adjacent each of the chains 12 is a string of dogs 144. Referring particularly to FIG. 9, it will be seen that these dogs have inclined upper edges 145, and the dogs are pivoted about pins 146 so that they normally adopt a vertical orientation as illustrated by reference 144a. As the board 142, followed by board 143, is carried forward by the chains 12, their leading edges engage the inclined upper edges 45 of the successive dogs and push them forward, thus rotating the dogs to the orientation illustrated by reference 144b. As the trailing edge of the board 143 clears the successive dogs, they rotate back to their vertical orientation. Eventually, the forward edge of piece 142 engages and is restrained by the stop portions 21b of the duckers 21. At this point, the dogs trailing the rearward edge of piece 143 have swung back to their vertical orientation as described above and as the end 143a of the piece 143 tries to skew to the rear in the manner illustrated by FIG. 7B, but it is restrained by the leading edge 147 of dog 148 (see FIG. 9)—the dogs being prevented by means of stops 149 from rotating counter-clockwise beyond their vertical orientation under rearward pressure from the board 143.

We claim:

1. In combination a lug loader for loading a blanket of boards of lumber from a feed transfer onto a lugged transfer with one board per lug-spacing, said combination wherein the board conveying surfaces of said feed transfer and said lugged transfer are disposed in substantially coplanar relationship and said feed transfer includes a plurality of feeder chains extending in spaced parallel relationship and travelling in tandem to convey said boards towards said lugged transfer;

a plurality of saw-toothed wheels respectively located parallel to and between said feeder chains and forming a row of said wheels extending transversely of said feed transfer;
a plurality of ducker arms respectively located parallel to and between said saw-toothed wheels and said feeder chains and forming a row of said ducker arms extending parallel to said row of saw-toothed wheels;
each ducker arm having a board-receiving portion positioned to receive boards individually from said feed transfer and constituting means to support only a board single lying transversely across said ducker arms, and each ducker arm having a stop portion preventing travel of said board beyond said board-receiving portion, said ducker arms being pivotally mounted for unison rotation between raised and lowered positions without interrupting contact between the succeeding boards of said blanket and said feed transfer;
means for rotating said ducker arms between said raised and lowered positions, said ducker arms being located relative to said saw-toothed wheels such that said board lying thereacross is maintained out of engagement with and straddles said saw-toothed wheels in said raised position of said arms and the underside of said board is lowered into positive engagement with said saw-toothed wheels when said arms move from their raised to their lowered positions;
means for rotating said saw-toothed wheels with sufficient speed that when the teeth thereof positively engage the underside of a board lowered onto said wheels by said ducker arms, said board is propelled toward said lugged transfer;
detecting means for detecting the presence or absence of a board on said ducker arms and for providing a control signal in accordance with the condition detected;
signal generating means associated with said lugged transfer for providing a control signal at predetermined points of progression of said lugged transfer whereat a lug thereof is at a position to receive a board from said feed transfer; and
control means including logic circuitry which provides an output signal to actuate said means for pivoting said ducker arms such that when said lugged transfer is at an appropriate point of progression as aforesaid to receive said board and said detecting means verifies the presence of said board on said ducker arms, the signals applied to said control means result in an output signal which causes said ducker arms to be rotated to their lowered position, and when said detecting means verifies that said board has been propelled forward by said saw-toothed wheels and is clear of said ducker arms, said signal from said detecting means to said control means results in an output signal causing said ducker arms to be returned to their raised position to receive the next board.

2. The apparatus of claim 1, wherein said detecting means comprises a light source and a photoelectric-eye located relative to said ducker arms such that the light beam from said light source to said photoelectric-eye is interrupted by a board lying across said ducker arms and is re-established when the trailing edge of said board clears the path of said light beam as said board is propelled forward by said saw-toothed wheels.

3. The apparatus of claim 1, wherein further feed means are provided to feed boards to said feed transfer, and further detecting means are provided to detect a backlog of boards on said feed transfer and, in response thereto, provide a control signal which slows down or halts the rate of feed of boards to said feed transfer until the backlog has dissipated.

4. The apparatus of claim 1, wherein said further feed means comprises a storage transfer having drive means therefor and said control signal from said further detecting means is applied to slow or halt said drive means.

5. The apparatus of claim 1, wherein said ducker arms are secured to and rotatable with a common shaft having a crank extending therefrom and said drive means for said ducker arms comprises an air cylinder having a piston rod connected to said crank, and a solenoid-operated air valve is connected in an air supply to said cylinder and is actuated by said output signal from said control means, to extend or retract said piston rod and consequently move said crank to raise or lower said ducker arms.

6. The apparatus of claim 1, wherein said control means includes a time-delay circuit which delays application of said output signal from said control means to said drive means for raising of said ducker arms to enable a board to completely clear said ducker arms before said ducker arms are returned to their raised position.

7. The apparatus of claim 6, wherein said time-delay circuit provides decreasing delay with increasing throughput speed of the apparatus.

8. In combination a lug loader for loading a blanket of boards of lumber from a feed transfer onto a lugged transfer with one board per lug-spacing, said combination wherein the board conveying surfaces of said feed transfer and said lugged transfer are disposed in substantially coplanar relationship, and said feed transfer includes a plurality of feeder chains extending in spaced parallel relationship and traveling in tandem to convey said boards towards said lugged transfer;
abrasive board engaging means located between said feeder chains and before at least a portion of said lugged transfer for propelling said boards onto said lugged transfer;
a plurality of ducker arms respectively located between said abrasive board engaging means and said feeder chains, each ducker arm having a board receiving portion positioned to receive boards individually from said feed transfer and constituting means to support only a single board lying transversely across said ducker arms, each ducker arm having a stop portion preventing travel of said board beyond said board receiving portion, said ducker arms being pivotally mounted for unison rotation between raised and lowered positions without interrupting contact between the succeeding boards of said blanket and said feed transfer;
means for rotating said ducker arms between said raised and lowered positions, said ducker arms being located relative to said abrasive board engaging means such that said board lying thereacross is maintained out of engagement with and straddles said abrasive board engaging means in said raised position of said ducker arms and the underside of said board is lowered into positive engagement with said abrasive board engaging means when said ducker arms are moved from their raised to their lowered positions;

means for rotating said abrasive board engaging means with sufficient speed so that when the abrasive board engaging means positively engages the underside of a board lowered there by said ducker arms said board is propelled toward said lugged transfer; and detecting and control means for indicating the presence or absence of a board on said ducker arms and for progressively raising and lowering said ducker arms to assure a single board is lowered by the ducker arms onto the abrasive board engaging means at one time.

9. In combination, a lug loader for loading a blanket of boards of lumber from a feed transfer onto a lugged transfer with one board per lug-spacing, said combination wherein said feed transfer constitutes mweans to convey said boards towards said lugged transfer;

a plurality of laterally spaced rotative abrasive board engaging means forming a row transversely of said feed transfer for conveying said boards toward said lugged transfer;

a plurality of ducker arms respectively located parallel to and between said board engaging means and forming a row of said ducker arms extending parallel to said row of board engaging means;

each ducker arm having a board-receiving portion positioned to receive boards individually from said feed transfer and constituting means to support only a single board lying transversely across said ducker arms, and each ducker arm having a stop portion preventing travel of said board beyond said board-receiving portion, said ducker arms being pivotally mounted for unison rotation between raised and lowered positions without interrupting contact between the succeding boards of said blanket and said feed transfer;

means for rotating said ducker arms between said raised and lowered positions, said ducker arms being located relative to said board engaging means such that said board lying thereacross is maintained out of engagement with and straddles said board engaging means in said raised position of said arms and the underside of said board is lowered into positive engagement with said board engaging means when said arms move from their raised to their lowered positions;

means for rotating said board engaging means with sufficient speed that when the abrasive parts thereof positively engage the underside of a board lowered onto said board engaging means by said ducker arms, said board is propelled toward said lugged transfer;

detecting means for detecting the presence or absence of a board on said ducker arms and for providing a control signal in accordance with the condition detected;

signal generating means associated with said lugged transfer for providing a control signal at predetermined points of progression of said lugged transfer whereat a lug thereof is at a position to receive a board from said feed transfer; and control means including logic circuitry which provides an output signal to actuate said means for pivoting said ducker arms such that when said lugged transfer is at an appropriate point of progression as aforesaid to receive said board and said detecting means verifies the presence of said board on said ducker arms, the signals applied to said control means result in an output signal which causes said ducker arms to be rotated to their lowered position, and when said detecting means verifies that said board has been propelled forward by said board engaging means and is clear of said ducker arms, said signal from said detecting means to said control means results in an output signal causing said ducker arms to be returned to their raised position to receive the next board.

10. In combination a lug loader for loading a blanket of boards of lumber from a feed transfer onto a lugged transfer with one board per lug-spacing, said combination wherein said feed transfer constitutes means to convey said boards towards said lugged transfer;

laterally speed abrasive board engaging means located adjacent said feed transfer and before at least a portion of said lugged transfer for propelling said boards onto said lugged transfer;

a plurality of ducker arms respectively located between said abrasive board engaging means, each ducker arm having a board receiving portion positioned to receive boards individually from said feed transfer and constituting means to support only a single board lying transversely across said ducker arms, each ducker arm having a stop portion preventing travel of said board beyond said board receiving portion, said ducker arms being pivotally mounted for unison rotation between raised and lowered positions without interrupting contact between the succeeding boards of said blanket and said feed transfer;

means for rotating said ducker arms between said raised and lowered positions, said ducker arms being located relative to said abrasive board engaging means such that said board lying thereacross is maintained out of engagement with and straddles said abrasive board engaging means in said raised position of said ducker arms and the underside of said board is lowered into positive engagement with said abrasive board engaging means when said ducker arms are moved from their raised to their lowered positions;

means for rotating said abrasive board engaging means with sufficient speed so that when the abrasive board engaging means positively engages the underside of a board lowered there by said ducker arms, said board is propelled toward said lugged transfer; and detecting and control means for indicating the presence or absence of a board on said ducker arms and for progressively raising and lowering said ducker arms to assure a single board is lowered by the ducker arms onto the abrasive board engaging means at one time.

11. The apparatus of claim 9 or 10, wherein said abrasive board engaging means includes rotative toothed members.

12. The apparatus of claim 11 wherein said rotative toothed members are saw-tooth wheels.

13. The apparatus of claim 10 wherein said detecting and control means includes a time-delay circuit which delays the raising of said ducker arms to enable said board to completely clear said ducker arms before the ducker arms are returned to their raised position.

* * * * *